M. COMFORT.
LAWN MOWER.
APPLICATION FILED OCT. 29, 1917.
1,275,851.
Patented Aug. 13, 1918.
2 SHEETS—SHEET 1.
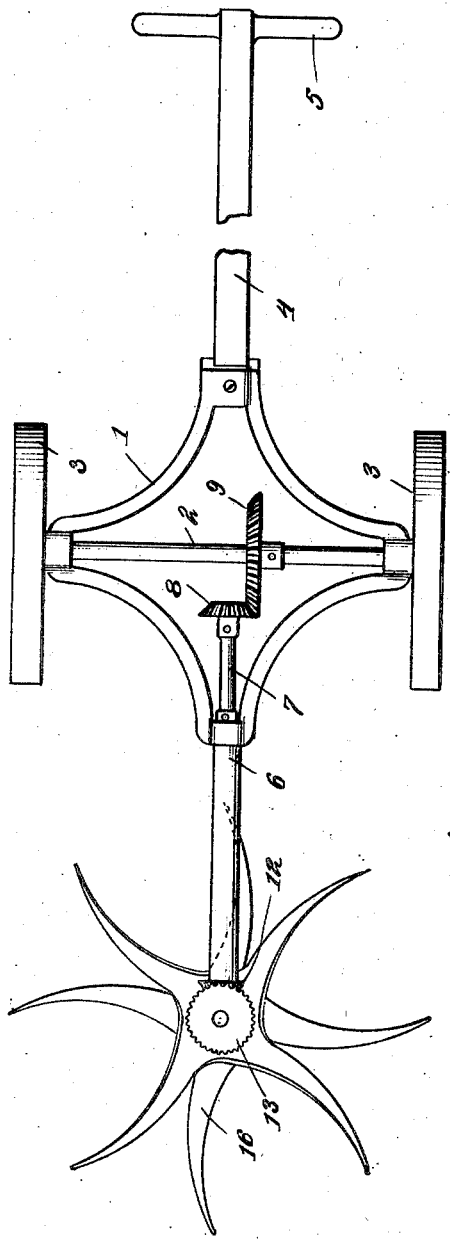
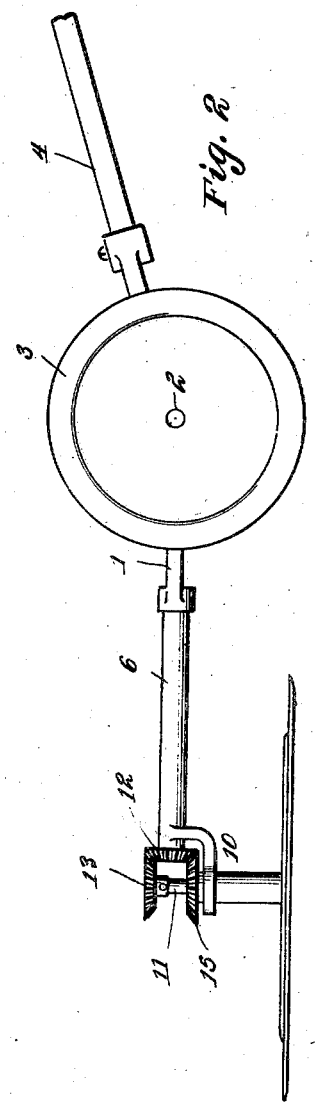
Inventor
Michael Comfort,
By Victor J. Evans
Attorney
Witnesses

M. COMFORT.
LAWN MOWER.
APPLICATION FILED OCT. 29, 1917.

1,275,851.

Patented Aug. 13, 1918.
2 SHEETS—SHEET 2.

Inventor
Michael Comfort,

Witnesses
C. F. Rudolph
L. Wilcox

By Victor J. Evans
Attorney

UNITED STATES PATENT OFFICE.

MICHAEL COMFORT, OF SOUTHINGTON, CONNECTICUT.

LAWN-MOWER.

1,275,851. Specification of Letters Patent. Patented Aug. 13, 1918.

Application filed October 29, 1917. Serial No. 198,985.

*To all whom it may concern:*

Be it known that I, MICHAEL COMFORT, a citizen of the United States, residing at Southington, in the county of Hartford and State of Connecticut, have invented new and useful Improvements in Lawn-Mowers, of which the following is a specification.

This invention relates to lawn mowers and it consists in the novel features hereinafter described and claimed.

An object of the invention is to provide a lawn mower of simple and durable structure which includes a wheel mounted frame, the said frame having a forwardly projecting tube and a shaft journaled therein. Means are provided for rotating the said shaft from the axle upon which the frame is mounted. A head is carried at the forward end of the said tube and blades are mounted for rotation in opposite directions below the said head. Means are provided for rotating the blades from the head. The parts are so assembled and arranged that the blades may be projected under overhanging branches of bushes and operated to cut the grass and they also may be projected in corners or other places where space is limited for the purpose of cutting the grass.

In the accompanying drawing:—

Figure 1 is a top plan view of the lawn mower.

Fig. 2 is a side elevation of the same.

Figure 3:
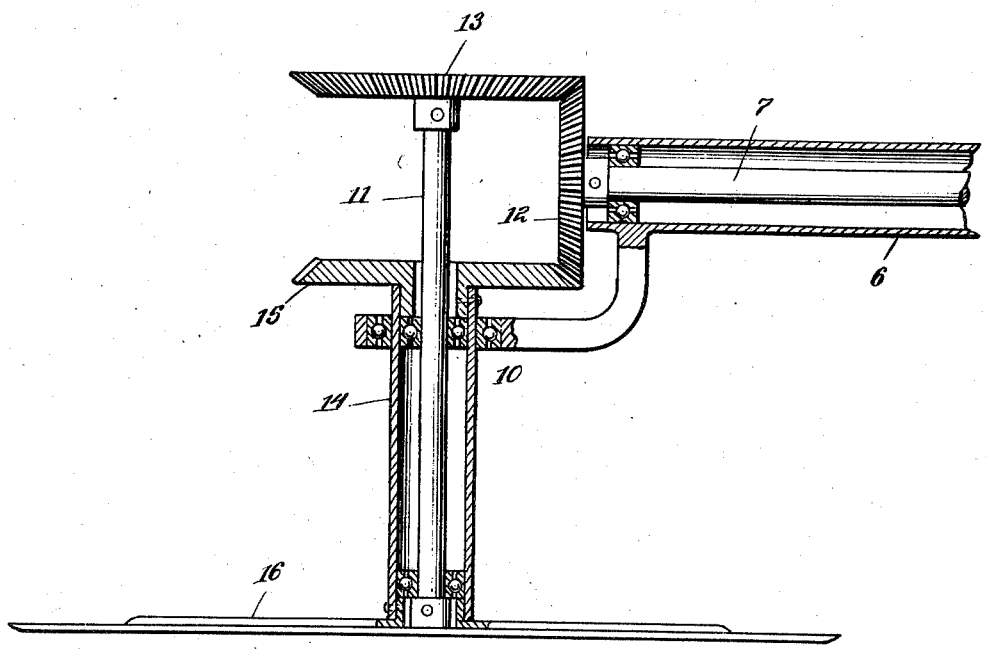
Fig. 3 is a vertical sectional view of an end portion of the same.
Figure 4:
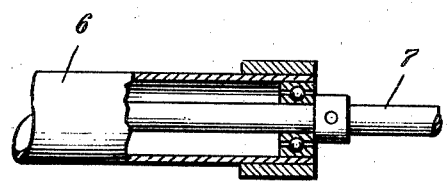
Fig. 4 is a detailed sectional view of an intermediate portion of the same.

The lawn mower comprises a frame 1 which is approximately rectangular in plan and which is mounted upon a journaled axle 2. Wheels 3 are secured at the ends of the axle 2 in a usual manner and may travel over the surface of the lawn and rotate the axle 2. A staff 4 is connected with the rear portion of the frame 1 and is upwardly and rearwardly inclined. A handle 5 is carried at the upper rear end of the staff 4 and may be used for propelling the frame and wheels over the surface of the lawn. A tube 6 extends forwardly from the frame 1 and a shaft 7 is journaled for rotation in the said tube. A beveled pinion 8 is carried at the rear end of the shaft 7 and is located between the sides of the frame 1 and meshes with a beveled pinion 9 which is fixed upon the axle 2. A head 10 is fixed to the forward end of the tube 6 and a shaft 11 is journaled at its upper portion in the head 10. A beveled pinion 12 is carried at the forward end of the shaft 7 and is located above head 10. The said pinion 12 meshes with a similar pinion 13 which is carried at the upper portion of the shaft 11.

A tube 14 surrounds the lower portion of the shaft 11 and carries a beveled pinion 15 which meshes with the pinion 12 at the side thereof opposite that side at which the pinion 13 engages the pinion 12. Blades 16 are carried by the shaft 11 and the sleeve 14 and the said blades 16 are curved as best shown in Fig. 1 of the drawing. A ball bearing 17 is interposed between the tube 6 and shaft 7 and similar bearings 18 are interposed between the head 10 and the tube 14 and the tube 14 and the shaft 11.

It is apparent that as the wheels 3 move over the surface of the lawn the axle 2 is rotated whereby rotary movement is transmitted through the beveled pinions 9 and 8 to the shaft 7. Through the beveled pinion 12 rotary movement is transmitted to the pinions 13 and 15 in opposite directions and through the shaft and sleeve which are connected with the pinions 13 and 15 the blades 16 are rotated in opposite directions and their concaved edges come toward each other whereby the grass is received between the said edges and as the concaved edges of the blades 16 move past or beyond each other the grass is severed and the lawn is trimmed.

By reason of the fact that blades 16 are located well in advance of the frame 1 and the wheels 2 the said blades may be projected under low hanging branches of bushes or shrubbery and accomplish the cutting of the grass at the surface of the lawn. Also the said blades may be projected in corners or other places where space is limited to accomplish the cutting operation.

From the foregoing description taken in conjunction with the accompanying drawings, it will be seen that a lawn mower of simple and durable structure is provided and that the same may be used conveniently and to advantage for trimming a lawn under low hanging branches of shrubbery and also used for trimming a lawn in corners or other places where space is limited.

Having thus described the invention what is claimed is:

A lawn mower comprising a frame, an axle journaled on the frame, wheels supporting the axle, a tube attached to the frame and extending forwardly therefrom, a head fixed to the tube, a shaft journaled in the tube, means for rotating the shaft from the axle, a second tube supported by and journaled in the head and disposed at an angle to the first mentioned tube, a shaft journaled in the second mentioned tube, means for transmitting rotary movement from the first mentioned shaft to the last shaft and for transmitting opposite rotational movement to the tube, and blades carried by the last mentioned shaft and by the tube located below the frame and head and in advance of the wheels.

In testimony whereof I affix my signature.

MICHAEL COMFORT.